United States Patent [19]

Dean et al.

[11] Patent Number: 4,598,356

[45] Date of Patent: Jul. 1, 1986

[54] DATA PROCESSING SYSTEM INCLUDING A MAIN PROCESSOR AND A CO-PROCESSOR AND CO-PROCESSOR ERROR HANDLING LOGIC

[75] Inventors: Mark E. Dean, Boynton Beach; Dennis L. Moeller, Delray Beach, both of Fla.

[73] Assignee: International Business Machines Corporation, Armonk, N.Y.

[21] Appl. No.: 567,296

[22] Filed: Dec. 30, 1983

[51] Int. Cl.⁴ .................... G06F 13/14; G06F 13/42
[52] U.S. Cl. ................................................ 364/200
[58] Field of Search ... 364/200 MS File, 900 MS File

[56] References Cited

U.S. PATENT DOCUMENTS

| | | | |
|---|---|---|---|
| 3,771,131 | 11/1973 | Ling | 364/200 |
| 3,786,430 | 1/1974 | Hajdu et al. | 364/200 |
| 3,864,670 | 2/1975 | Inoue et al. | 364/200 |
| 3,866,184 | 2/1975 | Buhrke et al. | 364/200 |
| 3,882,455 | 5/1975 | Heck et al. | 364/200 |
| 4,253,183 | 2/1981 | Taylor et al. | 364/200 |
| 4,392,201 | 7/1983 | Brown et al. | 364/200 |

*Primary Examiner*—David Y. Eng

[57] ABSTRACT

In a data processing system including a main processor and a co-processor, a logic circuit is coupled to receive error and busy outputs of the co-processor to generate an interrupt output on co-incidence of active error and busy signals and to latch the busy signal to the main processor to ensure that the main processor will honor the interrupt before executing another co-processor instruction.

5 Claims, 2 Drawing Figures

DATA PROCESSING SYSTEM INCLUDING A MAIN PROCESSOR AND A CO-PROCESSOR AND CO-PROCESSOR ERROR HANDLING LOGIC

DESCRIPTION

1. Field of the Invention

The present invention relates to a data processing system including a main processor unit and a co-processor unit. In particular, it relates to an arrangement for handling interrupts to the main processor in response to the generation of error signals by the co-processor.

2. Background Art

Main multiprocessor systems have been shown in the prior art. These vary from systems in which each processor operates substantially independently within the system to those in which one processor is slaved to the other. In one group of such systems, each processor has full access to other units in the system with full access to I/O and memory devices with bus contention devices determining access of the processors to address and data busses. In a further group, one processor is defined as a main processor and a further processor as a co-processor. In systems of this group, the co-processor is used to enhance the performance of the system for certain classes of operations, such as numeric processing. Both processors have access to both the system address and data busses, but the main processor exerts control over the co-processor for operand transfers. One example of such a system is the iAPX 88/20 system produced by Intel Corporation and comprising an 8088 CPU with an 8087 numeric processor extension.

In another group of systems, the co-processor is slaved to the main processor. In such systems, the co-processor has access to the system data bus, but not to the address bus. Thus, operand transfer to or from the co-processor is fully controlled by the main processor. In effect, the main processor looks upon the co-processor as an I/O device. One example of such a system is the iAPX 286/20 system produced by Intel Corporation and comprising an 80286 main processor with an 80287 numeric processor extension. It is to systems of this type that the present invention is directed.

Referring back to the iAPX 88/20 system, unmasked exceptions during operation of the 8087 co-processor are indicated by means of an interrupt (INT) output. This signal is normally applied directly to a selected one of the interrupt request inputs of an interrupt controller. These inputs each have a different priority, so the designer can designate a particular interrupt priority for co-processor exceptions.

In the iAPX 286/20 system, the 80287 co-processor has an error output pin. In the recommended circuit for this system, this pin is directly coupled to an error input of the 80286 main processor. A signal on this input interrupts the main processor with an internally defined vector value, and no interrupt acknowledge cycles are performed. This creates a problem for a designer if he wishes to build a machine using an iAPX 286/20 system which is compatible with previous machines using an iAPX 88/20 system. This is because he has no choice in determining the main processor interrupt used in response to co-processor errors, and he can not use acknowledge cycles for such interrupts.

It is, therefore, an object of the present invention to provide a logic system responsive to error signals from a co-processor to generate control signals for handshaking interrupt sequences between a priority interrupt controller and a main processor.

In both the iAPX 286/20 and iAPX 88/20 systems, the co-processor includes a busy output pin. An active signal on this pin indicates the operating condition of the co-processor, and this signal, on occurrence of an error, remains active until the error condition is cleared. It has been found that in some cases spurious signals on the error output can appear when the co-processor is not busy. This, of course, means that the main processor may be interrupted unnecessarily.

It is, therefore, a further object of the present invention to provide a logic system responsive only to both error and busy signals from a co-processor to initiate interrupt sequences for a main processor.

SUMMARY OF THE INVENTION

According to the invention there is provided a data processing system including a main processor and a co-processor, in which the co-processor is of the type having an error output, a busy output and a select input responsive to chip select inputs to effect data transfers on the data bus, and including a logic circuit having inputs coupled to said error and busy outputs and responsive to active signals on both these inputs to produce an interrupt request signal for the main processor.

BRIEF DESCRIPTION OF THE DRAWINGS

FIG. 1 is a simplified block diagram of a CPU embodying the present invention. Only those components and connections relevant to the present invention are shown in order to set out the features of the invention clearly.

Figure 1:
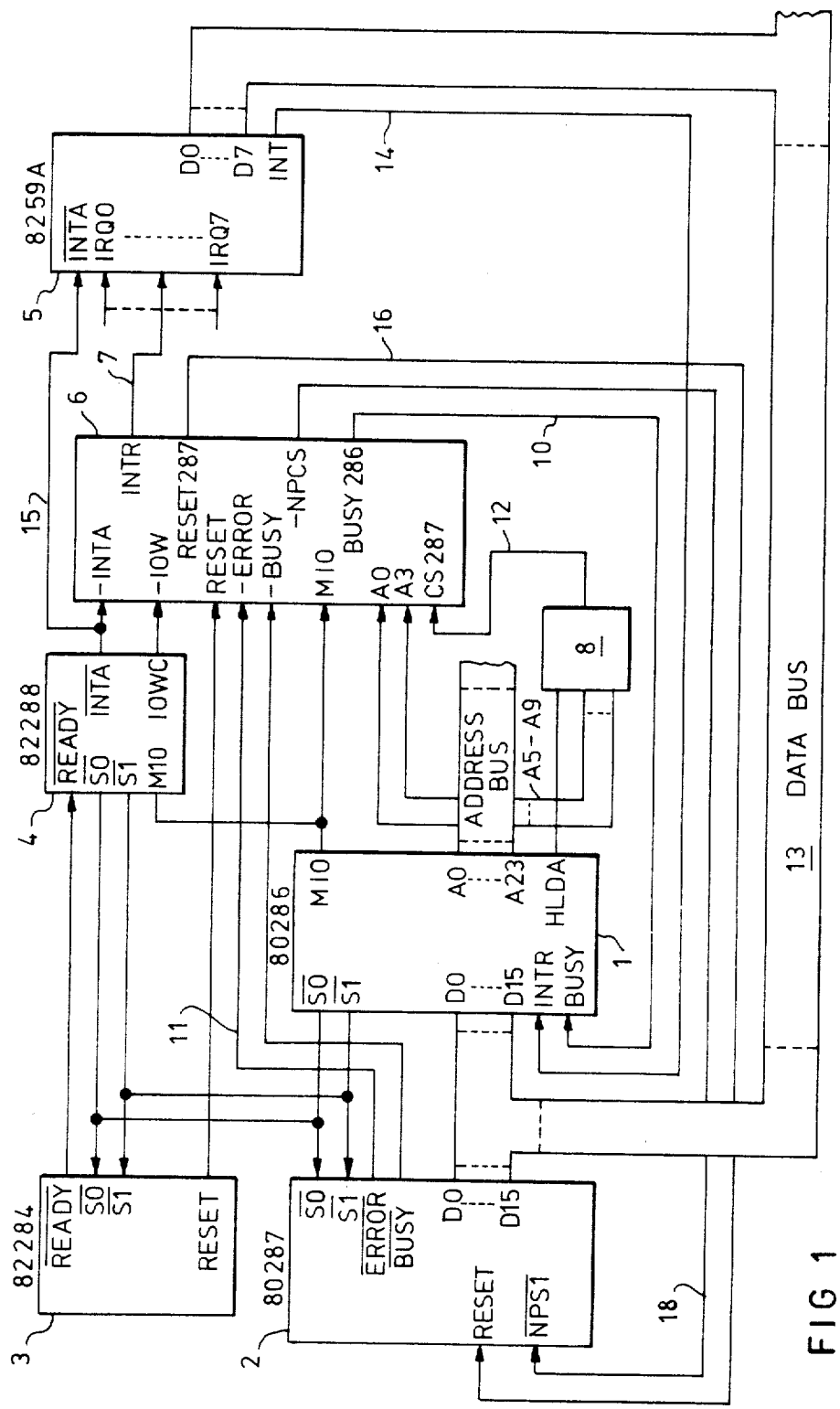
FIG. 1 is a block diagram showing major components of a data processing system embodying the invention.
Figure 2:
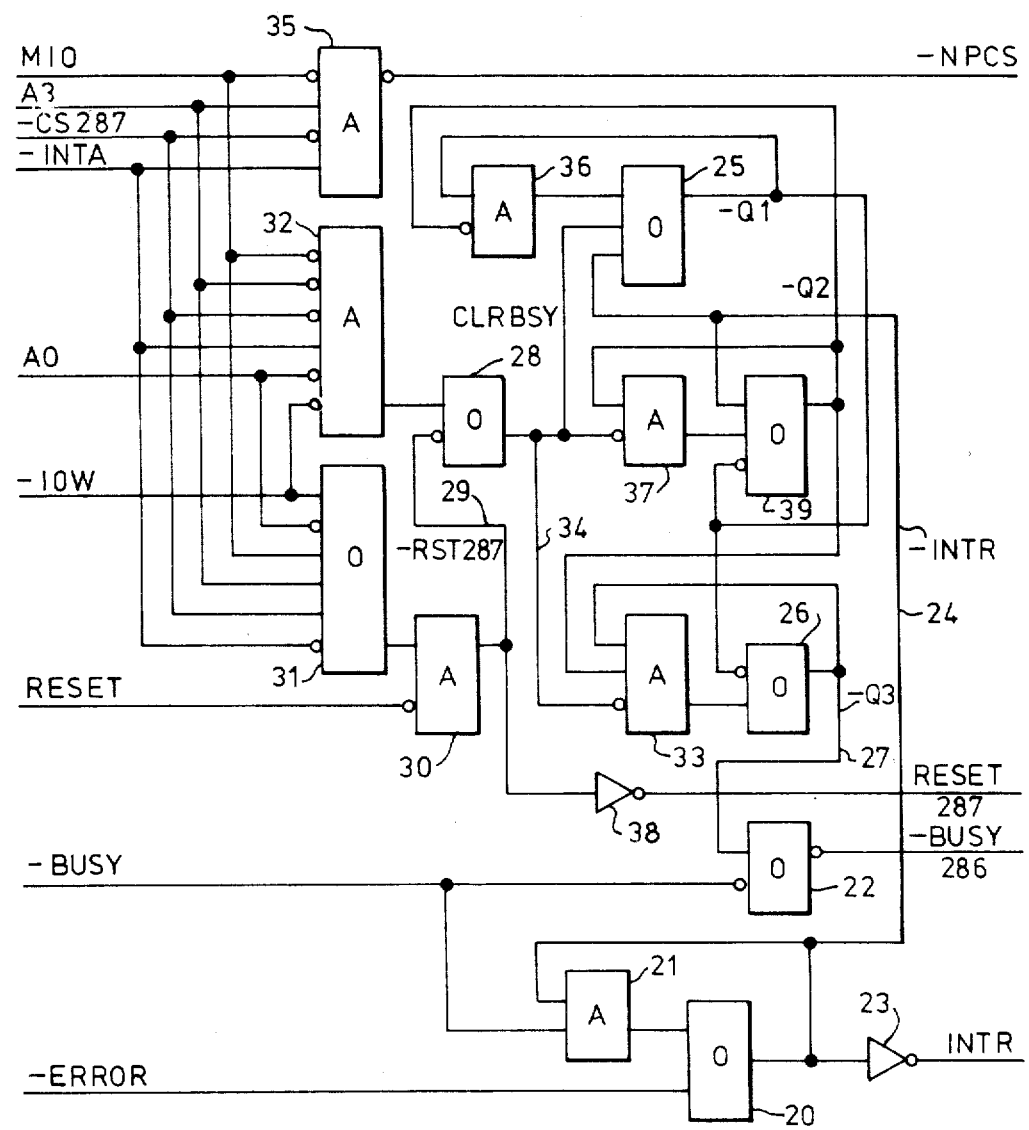
FIG. 2 is a block diagram of an interrupt control logic circuit employed in the FIG. 1 system.

The CPU comprises a main microprocessor 1 and a mathematical co-processor 2. These are respectively type 80286 and type 80287 processors manufactured by Intel Corporation which together form an iAPX 286/20 computing system. Clocking signals (not shown) for the processors are provided by an 82284 clock generator and ready interface unit 3, also manufactured by Intel Corporation. Unit 4 is a type 82288 bus controller and unit 5 is an 8259A programmable interrupt controller, both of which are also produced by Intel Corporation. One interrupt request input 7 to interrupt controller 5 is provided by a logic circuit 6. Details of this circuit, which may be implemented in discrete form or in the form of a programmable array logic (PAL) chip, are shown in FIG. 2. The final element in FIG. 1 is a decoder circuit, which is responsive to selected address lines from microprocessor 1 to produce chip select signals for co-processor 2.

As mentioned above, the FIG. 1 is a simplified diagram of the CPU, and with reference to the 80286 microprocessor 1, a number of the 63 pin connections have been omitted. Those shown include the status outputs $\overline{S0}$ and $\overline{S1}$ which indicate initialization of a bus cycle and, in conjunction with other outputs, including the MIO (memory, not I/O) output, indicate the type of bus cycle to be performed. The outputs of interest in this description are interrupt acknowledge (MIO, $\overline{S1}$, $\overline{S0}=0$), and I/O read (MIO, $\overline{S1}=0$, $\overline{S1}=1$). D0 through D15 are the 16 bit data bus input/output pins. The INTR pin is an interrupt request input which, when high, requests the processor to suspend its current program to service an external interrupt. The $\overline{BUSY}$ pin is used to indicate the operating condition of co-processor 2, it is active, that is low, when the co-processor is carrying out an operation. Normally this pin is coupled directly to a $\overline{BUSY}$ pin on the co-processor, but in accordance with the present invention, it will be seen that it is coupled from logic circuit 6 through a line 10. As mentioned above, outputs from a MIO pin operate in conjunction with the $\overline{S0}$ and $\overline{S1}$ outputs, the MIO output, when high, indicates that a memory cycle is in progress, when low it indicates an I/O cycle or an interrupt acknowledge cycle. Lastly, A0 through A23 provide a 24 bit address bus output.

Turning now to the 80287 co-processor 2, the RESET input, when high causes the co-processor to terminate is present activity and to enter a non-operative state. The $\overline{NPSI}$ (numeric processor select 1) input is used to select the co-processor, data transfers to or from the co-processor can only take place when this pin is low. The $\overline{S0}$ and $\overline{S1}$ inputs are used to monitor ESCAPE instructions in micro-processor 1, which instructions control data transfer between the processors. The $\overline{ERROR}$ output, when low, indicates that an unmasked error condition has arisen in the co-processor. This output is normally coupled to a $\overline{ERROR}$ input in the 80286 main processor 1, but in accordance with this invention, it provides an input to logic circuit 6 over line 11. Lastly pins D0 through D15 are coupled, as inputs or outputs, to data bus 13.

Note that the 80287 has no address outputs. Management of data transfer to and from this processor is controlled by main processor 1. In effect, to the main processor, the co-processor looks like an I/O device selected by address outputs which are decoded by decoder 8 to provide a co-processor chip select signal on line 12 to logic circuit 6 and from this circuit to co-processor 2 over line 18.

The 82284 clock generator and ready interface unit 3 provides a system clock output (not shown) for processors 1 and 2 and the bus controller 4. In response to the $\overline{S0}$ and $\overline{S1}$ inputs, together with control inputs (not shown), this unit develops a $\overline{READY}$ output which, when low, indicates the end of a bus cycle. A RESET output is used to enter the system into an initial reset state on power on.

The 82288 bus controller 4 is responsive to a $\overline{READY}$ signal from clock generator 3 to prepare for the next bus cycle. The function of this bus cycle is determined by the values of the signals $\overline{S0}$, $\overline{S1}$ and MIO from processor 1 as set out in the above description of the outputs of that processor. It has nine outputs to effect the control of data flow through the system, such as I/O read, I/O write, memory read and memory write. The two outputs shown are $\overline{INTA}$, the interrupt acknowledge output which, when low, tells an interrupting device that its interrupt request has been acknowledged, and $\overline{IOWC}$, the I/O write command which, when low, instructs an I/O device to read data from the data bus.

Unit 5 is the 8259A programmable interrupt controller. This includes a number of interrupt request inputs IRQ0 through IRQ7. These are coupled to receive interrupt requests from I/O devices and have different priorities with IRQ0 the highest and IRQ7 the lowest. An interrupt request input is an active high signal. The 8259A evaluates requests, and in response to that one with the highest priority, sends an interrupt (INT) active high signal over line 14 to the INTR input of main processor 1. When the system replies with an interrupt acknowledge signal ($\overline{INTA}$, active low) on line 15, register bits within the 8259A indicating the highest priority interrupt input and the level actually being serviced. Upon receipt of a further $\overline{INTA}$ signal, a lower 8 bit subroutine address is released to the data bus 13 for receipt by the main processor 1. This address points to the main processor routine used to service the interrupt.

Decoder 8 is employed to produce a number of control outputs, of which only one, the co-processor chip select output is shown. This output is active low when address inputs A5-A7 from main processor are high, address inputs A8 and A9 ar low and the processor is not emitting a hold acknowledge (HLDA) signal.

In operation, logic circuit 6 looks for an active $\overline{ERROR}$ signal when the $\overline{BUSY}$ signal from co-processor signal is active. When these signals coincide, the −BUSY 286 output on line 10, which normally corresponds to the $\overline{BUSY}$ signal from the co-processor is latched and the INTR output on line 7 goes high. This provides an interrupt request to the interrupt controller. When this request is the highest priority request, the interrupt controller issues a corresponding interrupt signal, over line 14, to the main processor INTR input. Upon receipt of this input, main processor 1 suspends its current program and initiates two interrupt bus cycles. On each of these, the MIO, $\overline{S0}$ and $\overline{S1}$ outputs are low, so bus controller 4 issues a $\overline{INTA}$ signal. On the first of these cycles, interrupt controller 5 is set up to define a main processor routine which is to service the interrupt by defining a pointer to this routine. Interrupt controller 5 does not drive the data bus at this time. During the second interrupt bus cycle, that is, when the main processor issues the second $\overline{INTA}$ signal, interrupt controller 5 releases an 8 bit pointer, defining the interrupt routine, on to the data bus from which it is read by the main processor. In the main processor, the pointer initiates an error handler routine to clear the co-processor error condition. During this routine, the main processor produces particular outputs on the A0 through A9 address lines to define particular functions. The functions of interest with respect to the present invention are as follows:

Co-processor chip select: A8, A9=0, A3, A5, A6 and A7=1. Note that this particular function is not limited to the error handling routine. It is used to select the co-processor for data transfer on any I/O write command to the co-processor.

Clear busy: A0, A3, A8, A9=0, A5, A6 and A7=1.

Co-processor reset: A3, A8, A9=0, A0, A5, A6, A7=1. Note that this particular function must be used to exit the co-processor from its protected mode.

In these groups, bits A8 and A9, when zero, define the main processing unit and not attached I/O devices, bits A5, A6 and A7, when one, define the co-procesor, and bits A0 and A3 define the functions as shown.

At the end of the second $\overline{INTA}$ signal, interrupt controller 5 is automatically reset to service the next interrupt request. At the end of the error handler routine, main processor 1 and co-processor 2 continue with their defined processing functions.

FIG. 2 shows details of logic circuit 6. This circuit includes three latch circuits which generate internal signals. These latches comprise AND gate 36 and OR gate 25 for a signal −Q1, AND gate 37 and OR gate 39 for a signal −Q2 and AND gate 33 and OR gate 26 for a signal −Q3. The function of these latches is to provide a latched high output −Q3 on line 27 when a −INTR signal on line 24 goes low, and to clear this latched condition when a clear busy (CLRBSY) signal from OR gate 28 goes high.

An OR gate 20 monitors the −ERROR input and, through AND gate 21, the −BUSY input. The output of OR gate (−INTR) is normally high, but goes now when the −BUSY and −ERROR inputs go low, indicating a co-processor error signal when that processor is in the busy condition. The low −INTR signal is latched through AND gate 21 to provide a latched high INTR signal for the interrupt controller through OR gate 23. The purpose of this circuit is to ensure that a latched INTR signal is generated only if a co-processor error signal is generated when the co-processor is busy. When the co-processor is not busy, transient signals on the −ERROR input cannot generate a latched INTR output. The −INTR signal on line 24, as explained above, now latches the −BUSY 286 output of OR gate 22 into its active (low) state to ensure that, at this time, no data transfer can take place between the main processor and co-processor even if the co-processor is no longer issuing a −BUSY signal. This ensures that main processor 1 will honor the interrupt before executing another co-processor instruction.

As indicated in the FIG. 1 description, the INTR input to the interrupt controller, when serviced in its priority order, generates an INT signal for the main processor. This processor responds by setting its MIO, $\overline{S1}$ and $\overline{S0}$ outputs low to cause bus controller 4 to issue an active $\overline{INTA}$ signal (low). At this stage, the inputs to the FIG. 2 logic circuit are such that its outputs remain unchanged.

On the second $\overline{INTA}$ signal, the pointer is passed to main processor 1 from interrupt controller 5 to initiate the error handling routine. A clear busy command is issued by the error handling routine. As indicated above, address bits A0 and A3 are both "0" for this command. In addition, at this time, MIO from the main processor is "0", the −CS287 signal from decoder 8 is "0", the −INTA signal is now "1". The main processor drives bus controller 4 to generate an IOWC (I/O write command), active low, providing the −IOW input to the logic circuit. AND gate 32 is therefore enabled to apply a high output through OR gate 28 along line 34 to AND gate 33. This disables the high latched −Q3 output from OR gate 26 on line 27, to clear the −BUSY 286 output to the main processor. Next, the main processor selects the co-processor by providing a "1" output on the A3 address line. With the other inputs to AND gate 35 remaining unchanged, this gate is enabled to lower the −NPCS output of the logic circuit to select the co-processor. The error handling routine may clear the co-processor error without the need to reset it. If, however, reset is required, this command, in which address bit A0 is "1", is issued by the main processor. At this time, MIO, −IOW and −CS287 are still low and −INTA and A0 are high. Accordingly, the output of OR gate 31 goes low. As the RESET input from clock generator 3 is always low except during a power on sequence, the output of AND gate 30 goes from high to low. This output is inverted by inverter 38 to provide a positive reset signal, RESET 287, to co-processor 2.

The RESET input to AND gate 30 is used to ensure that the co-processor is reset during a power up sequence of the system. When the system is initially powered up, this input is high, thereby forcing a low output from AND gate 30 to reset the co-processor. In addition, it provides an input to OR gate 28 to ensure that output −Q3 on line 27 is not initially latched positive to generate a −BUSY 286 signal.

As mentioned above, the FIG. 2 circuit may be implemented on a programmable array logic chip. This may be embodied on a Monolithic Memories Inc. 20 pin PAL16L8 chip programmed as follows:

Pin list: RESET,/ERROR,/BUSY, A0, A3,/IOW, M10,/CS287,/INTA, GND, TEST, NPCS, Q1, Q2, Q3, CLRBSY, RST287, INTR, BSY286, VCC, where GND is ground, TEST is a test pin, grounded in operation of the circuit, VCC is the voltage supply pin and the remaining pins are as shown in FIG. 2. The chip is programmed to perform the following boolean expressions:

```
/NPCS   = /M10 × A3 × CS287 × /INTA
/Q1     = /Q1 × Q2 + /CLRBSY + /INTR
/Q2     = /Q2 × CLRBSY + /INTR + Q1
/Q3     = /Q3 × /Q2 × CLRBSY + Q1
/CLRBSY = /A3 × /A0 × IOW × /M10 × CS287 ×
          /INTA + RST287
/RST287 = /RESET × M10 + /RESET × A3 +
          /RESET × /A0 + /RESET × /IOW +
          /RESET × /CS287 + /RESET × INTA
/INTR   = /ERROR + /BUSY × /INTR
/BSY286 = /Q3 + BUSY.
```

In summary, there has been shown a logic circuit which is coupled to monitor the busy and error outputs of a co-processor. On detection of an error signal in the presence of a busy signal, the logic circuit supplies an interrupt request to an interrupt controller while maintaining a co-processor busy input to a main processor. After the interrupt controller services the request to point to a main processor routine, the logic circuit is responsive to main processor command signals to remove the busy signal, then select the co-processor for data transfer and lastly, to reset the co-processor if it is in its protected mode, which is the only way in which this processor can exit from this mode.

While the invention has been described with reference to a preferred embodiment, it will be understood by those skilled in the art that various changes in form and detail may be made without departing from the spirit and scope of the invention as defined in the following claims.

We claim:

1. A data processing sysem comprising a main processor, a co-processor having a busy output which, when active, indicates that the co-processor is executing a command and is not available for external data transfer, and an error output which, when active, indicates a co-processor malfunction, and a logic circuit having inputs coupled respectively ot the error and busy outputs of the co-processor and including first logic means responsive only to coincident active error and busy outputs to generate an interrupt request signal to initiate a main processor error interrupt routine, second logic means responsive to an active busy signal from the co-processor to provide an active busy signal to the main processor, and latching means responsive to the interrupt request signal to latch the active busy signal to the main processor to prevent the main processor from executing a co-processor instruction until the interrupt is handled by said routine.

2. A data processing system according to claim 1 in which the logic circuit includes third logic means responsive to a clear busy command from the main processor to clear the active busy signal to an inactive state.

3. A data processing system according to claim 2 including an interrupt control unit having a plurality of interrupt request inputs and an interrupt output coupled to the main processor to signal an interrupt operation by the main processor in response to an interrupt request signal from the logic circuit coupled to a predetermined one of the interrupt request inputs.

4. A data processing system according to claim 3 in which the logic circuit includes fourth logic means responsive to signals representing an I/O write command from the main processor defining the co-processor to generate an active chip select signal to the co-processor to enable data transfer from the co-processor to the main processor.

5. A data processing system according to claim 3 in which the logic circuit includes fourth logic means responsive to signals representing a co-processor reset command from the main processor to generate a reset signal to reset the co-processor to a dormant state.

* * * * *